US012271562B2

(12) United States Patent
Vincent et al.

(10) Patent No.: US 12,271,562 B2
(45) Date of Patent: Apr. 8, 2025

(54) MULTI-AXIS MEASUREMENT WITH A CAPACITANCE MODULE

(71) Applicant: Cirque Corporation, Sandy, UT (US)

(72) Inventors: Paul Vincent, Kaysville, UT (US); Jon Bertrand, Taylorsville, UT (US)

(73) Assignee: Cirque Corporation, Sandy, UT (US)

( * ) Notice: Subject to any disclaimer, the term of this patent is extended or adjusted under 35 U.S.C. 154(b) by 151 days.

(21) Appl. No.: 17/893,304

(22) Filed: Aug. 23, 2022

(65) Prior Publication Data

US 2024/0069678 A1    Feb. 29, 2024

(51) Int. Cl.
*G06F 3/044* (2006.01)

(52) U.S. Cl.
CPC .. *G06F 3/0445* (2019.05); *G06F 2203/04107* (2013.01)

(58) Field of Classification Search
CPC ........ G06F 3/0445; G06F 3/044; G06F 3/041; G06F 2203/04107
See application file for complete search history.

(56) References Cited

U.S. PATENT DOCUMENTS

| | | | | |
|---|---|---|---|---|
| 9,360,967 B2 | 6/2016 | Hotelling | | |
| 2011/0084936 A1* | 4/2011 | Chang | ................... | G06F 3/0446 345/174 |
| 2011/0298744 A1* | 12/2011 | Souchkov | ............. | G06F 3/0446 345/174 |
| 2012/0026131 A1 | 2/2012 | Bytheway | | |
| 2012/0043977 A1* | 2/2012 | Kremin | ............... | G06F 3/04166 324/686 |
| 2014/0043251 A1* | 2/2014 | Wilson | .................... | G06F 3/041 345/173 |
| 2014/0062952 A1* | 3/2014 | Savitsky | ............. | G06F 3/04166 345/174 |
| 2014/0375570 A1* | 12/2014 | Cok | .................. | G06F 3/041661 345/173 |
| 2015/0084916 A1* | 3/2015 | Han | ...................... | G06F 3/0446 345/174 |
| 2015/0301682 A1* | 10/2015 | Kanazawa | ............ | G06F 3/0446 345/174 |
| 2020/0104013 A1* | 4/2020 | He | ........................ | G06F 3/0445 |
| 2020/0326828 A1* | 10/2020 | Otagaki | ................ | G06F 3/0446 |
| 2020/0387248 A1* | 12/2020 | Kim | ..................... | G06F 3/04182 |
| 2023/0004274 A1* | 1/2023 | Shin | ....................... | G06F 3/0418 |

* cited by examiner

*Primary Examiner* — Md Saiful A Siddiqui

(57) ABSTRACT

A device may include a first set of electrodes; a second set of electrodes transversely oriented from the first set of electrodes; and a processor and memory, where the memory has programmed instructions to cause the processor, when executed to: activate a first portion of electrodes in the first set, measure a first resulting capacitance from activating the first portion of electrodes with at least some electrodes of the second set, activate a second portion of electrodes in the second set, and measure a second resulting capacitance from activating the second portion of electrodes with at least some electrodes of the first set.

11 Claims, 13 Drawing Sheets

MULTI-AXIS MEASUREMENT WITH A CAPACITANCE MODULE

FIELD OF THE DISCLOSURE

This disclosure relates generally to systems and methods for capacitance modules, such as a touchpad. In particular, this disclosure relates to systems and methods for transmitting and sensing capacitance changes in capacitance modules.

BACKGROUND

A mutual capacitance touch sensor is often incorporated as a touchpad or touchscreen in electronic devices such as a laptop or smartphone. A mutual capacitance touch sensor functions by applying an electrical signal to a transmit electrode and sampling a capacitance change from a sense electrode to determine an x, y position of user input. The sample taken from the sense electrodes may be susceptible to noise, which may reduce the accuracy of the mutual capacitance sensor. In order to reduce noise, some mutual capacitance touch sensors employ certain methods to reduce the susceptibility of the touch sensor to noise.

An example of a touch sensor device is disclosed in U.S. Pat. No. 9,360,967 issued to Steve Hotelling. This reference discloses a mutual capacitance touch sensing device. The touch sensing device includes a mutual capacitive sensing controller having a plurality of distinct drive lines and a plurality of distinct sense lines; a source for driving a current or voltage separately though each drive line; and a mutual capacitance sensing circuit that monitors the capacitance at the sensing lines. The touch sensing device also includes a plurality of independent and spatially distinct mutual capacitive sensing nodes set up in a non-two-dimensional array. Each node includes a drive electrode that is spatially separated from a sense electrode. The drive electrode is coupled to one of the drive lines and the sense electrode is coupled to one of the sense lines. Each node is set up with a different combination of drive and sense line coupled thereto.

An example of a technique to reduce noise susceptibility in a mutual capacitance touch sensor is disclosed in WO Patent No. 2012016083A1 issued to Jared G. Bytheway, et al. This reference discloses a system and method for reducing noise on a touchpad that uses mutual capacitance on an X axis and Y axis grid of transverse electrodes that function as stimulus or drive electrodes on one axis and function as inputs or sense electrodes on a different axis, wherein there is significant noise that can affect operation of the touchpad, and wherein it is desirable to minimize the effects of this noise by simultaneously sampling a group of sense electrodes, wherein by sampling the sense electrodes at the same time, the level of noise on each sense electrode should be similar and can therefore be subtracted out of measured sense signals to therefore more accurately determine a position of a sensed object or objects on the touchpad.

Each of these references are herein incorporated by reference for all that they disclose.

SUMMARY

In one embodiment, a device may include a first set of electrodes; a second set of electrodes transversely oriented from the first set of electrodes; and a processor and memory, where the memory has programmed instructions to cause the processor, when executed to: activate a first portion of electrodes in the first set, measure a first resulting capacitance from activating the first portion of electrodes with at least some electrodes of the second set, activate a second portion of electrodes in the second set, and measure a second resulting capacitance from activating the second portion of electrodes with at least some electrodes of the first set.

The electrical signals applied to the electrodes in the first portion and the electrodes in the second portion may be in phase with each other.

The electrical signals applied to the electrodes in the first portion and the electrodes in the second portion may be out of phase with each other.

The electrical signals may be 180 degrees out of phase with each other.

The electrical signals may be out of phase with each other.

The electrical signals may be orthogonal phases to each other.

Transmitting the electrical signals out of phase with each other may have the characteristic of reducing constructive interference that may contribute to noise.

The electrical signals applied to the electrodes in the first portion and the electrodes in the second portion may have the same signal strength.

The electrical signals applied to the electrodes in the first portion and the electrodes in the second portion may have different signal strengths.

The electrical signals applied to the electrodes in the first portion and the electrodes in the second portion may have the same frequency.

The electrical signals applied to the electrodes in the first portion and the electrodes in the second portion may have different frequencies.

The electrical signals applied to the electrodes in the first portion and the electrodes in the second portion may have orthogonal frequencies.

The electrodes in the first portion or second portion may be adjacent electrodes.

At least one electrode in the first or second portion may be separated by at least one intervening electrode.

The electrodes of the first portion or second portion may be two electrodes.

The electrodes of the first portion and second portion may be three electrodes or more.

The memory may include programmed instructions to cause the processor, when executed, to determine a noise level associated with the measurement of the first capacitance change, the measurement of the second capacitance change, or combinations thereof.

The memory may include programmed instructions to cause the processor, when executed, to identify a location of user input with either the measurement of the first capacitance change or the measurement of the second capacitance change, based at least in part on which measurement has less noise.

In one embodiment, a method of operating a capacitance module may include applying electrical signals to a first portion of electrodes in a first set of electrodes of a capacitance module; measuring a first capacitance change in the first portion of electrodes using at least some electrodes in a second set of electrodes of the capacitance module; applying electrical signals to a second portion of electrodes in the second set; and measuring a second capacitance change in the second portion of electrodes using at least some electrodes in the first set.

The method may include determining a noise level associated with the measurement of the first capacitance change, the measurement of the second capacitance change, or combinations thereof.

The method may include identifying a location of user input with either the measurement of the first capacitance change or the measurement of the second capacitance change, based at least in part on which measurement has less noise.

The electrodes in the first portion or second portion may be two adjacent electrodes.

In one embodiment, a computer-program product may have a non-transitory computer-readable medium storing instructions executable by a processor to apply electrical signals to a first group of electrodes in a first set of electrodes of a capacitance module; measure a first capacitance change in the first group of electrodes using at least some electrodes in a second set of electrodes of the capacitance module; apply electrical signals to a second group of electrodes in the second set; and measure a second capacitance change in the second group of electrodes using at least some electrodes in the first set.

Figure 1:
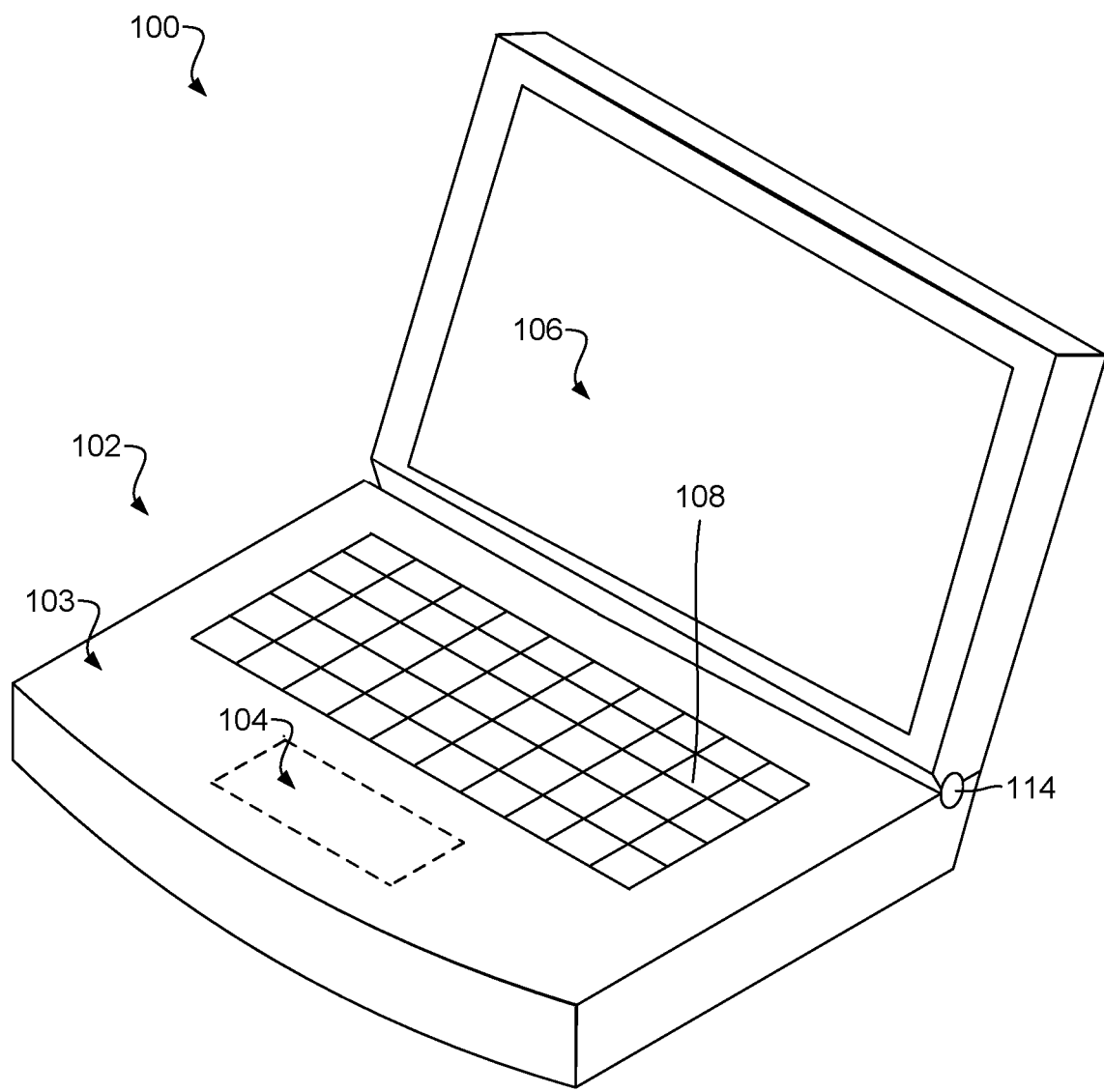
FIG. 1 depicts an example of an electronic device in accordance with the present disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For purposes of this disclosure, the terms "activate" or "activating an electrode" may generally refer to applying an electrical signal to an electrode. An electrical signal applied to an electrode may have variable voltage, amperage, wavelength, phase, and/or frequency. A transmit electrode in a mutual capacitance sensor may be activated, which may generate an electrical field around the activated electrode. The electric field of an activated electrode may change the capacitance of a nearby sense electrode or electrodes. The capacitance of sense electrodes may be measured, and changes in the capacitance of sense electrodes may be interpreted as user input with the mutual capacitance sensor. The resulting voltage or current of the sense electrode may be measured on the sense electrode to determine the capacitance change.

For the purposes of this disclosure, the term "electronic device" may generally refer to devices that can be transported and include a battery and electronic components.

Examples may include a laptop, a desktop, a mobile phone, an electronic tablet, a personal digital device, a watch, a gaming controller, a gaming wearable device, a wearable device, a measurement device, an automation device, a security device, a display, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For purposes of this disclosure, the term "signal strength" may generally refer to waveform amplitude. For example, if one measurement of capacitance versus time has an amplitude of five farads, it is "stronger" than a measurement that has an amplitude of two farads.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
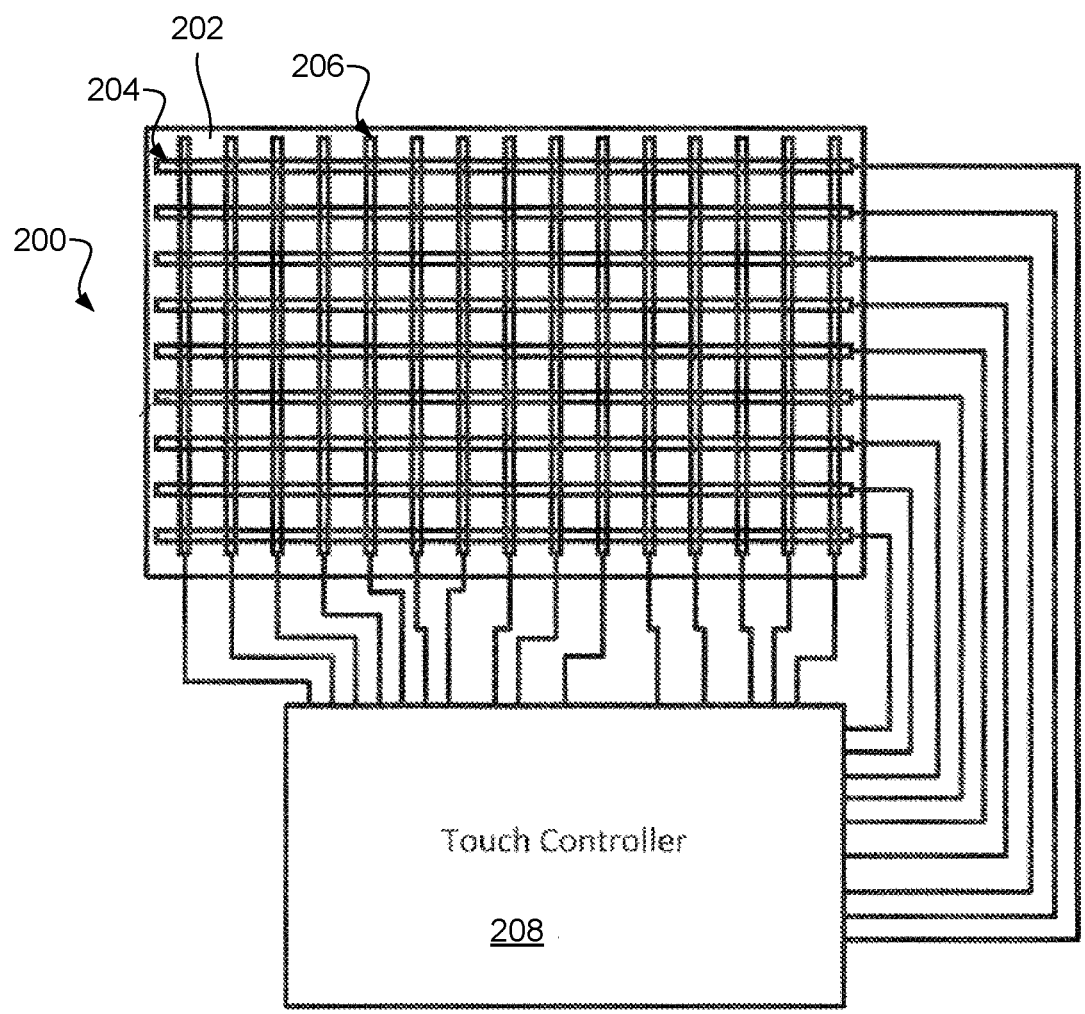
FIG. 2 depicts an example of a substrate with a first set of electrodes and a second set of electrodes in accordance with the present disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
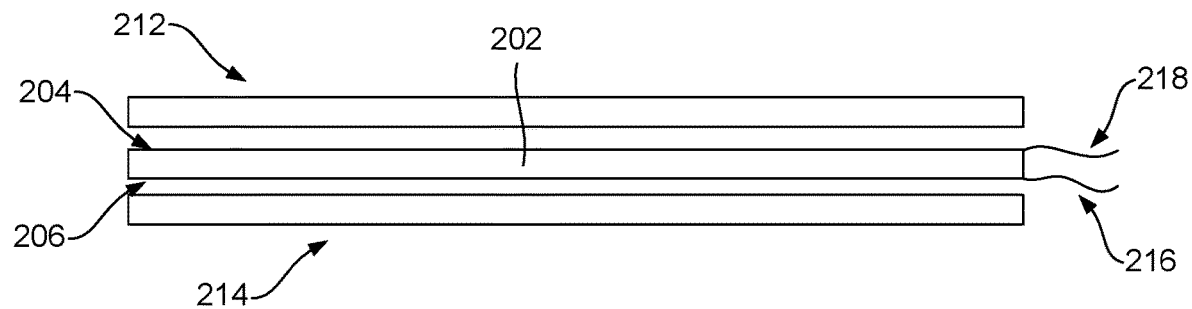
FIG. 3 depicts an example of a touch pad in accordance with the present disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage from the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
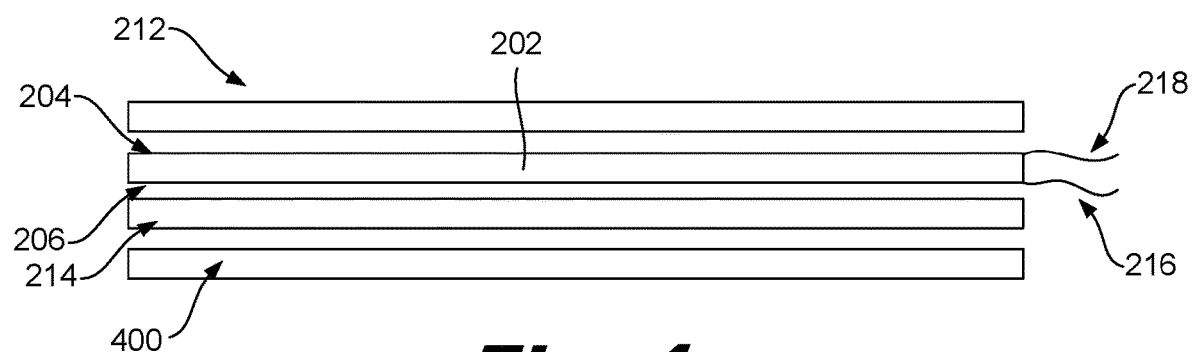
FIG. 4 depicts an example of a touch screen in accordance with the present disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

FIG. 5 depicts an example of a capacitance module 500. The capacitance module 500 includes a first layer 503, a second layer 504, and a processor 505. Although three components are identified in this example, in other examples, a capacitance module may include more components, such as additional layers, a components layer, additional processors, LEDs, haptic components, antennas, other components, and combinations thereof.

The first layer 503 includes a first set 501 of electrodes. The first layer 503 may be a printed circuit board (PCB), substrate, some other material, or a combination thereof. The electrodes of the first set 501 may be etched, printed, or otherwise formed on the layer. The electrodes of the first set 501 may be made of a conductive material such as copper, gold, another material, or combinations thereof.

The second layer 504 includes a second set 502 of electrodes. The second layer 504 may be a PCB, substrate, some other material, or a combination thereof. The electrodes of the second set 502 may be etched, printed, or otherwise formed on the substrate of the layer. The electrodes of the second set 502 may be made of a conductive material such as copper, gold, another material, or combinations thereof.

The second set 502 of electrodes is arranged transverse from the first set 501 of electrodes. The first set 501 and the second set 502 form a mutual capacitance sensor. While this example depicts a mutual capacitance sensor where one set of electrodes is transverse to another set of electrodes in a rectangular arrangement, in other examples, electrodes may be arranged differently. For example, sets of electrodes may be arranged as radial patterns, linear strings, in other arrangements, or combinations thereof.

While the illustrated example depicts the first and second sets 501, 502 of electrodes on different layers, in some cases, these sets 501, 503 may be arranged on the same layer. In such an example, the first set 501 may be located on a first surface of the substrate, and the second set 502 may be placed on a second surface of the substrate. The second surface being opposite the first surface. The first and second sets 501, 502 may be separated and electrically isolated by the thickness of the substrate. In other examples, the first and second sets 501, 502 may be deposited on the same surface of the substrate and routed through vias as appropriate to avoid physical contact between the sets 501, 502 thereby avoiding shorting between the sets 501, 502.

While the mutual capacitance sensor formed by the first set 501 of electrodes and the second set 502 of electrodes includes only two sets of electrodes, a mutual capacitance sensor may contain a different number of electrodes. For example, a mutual capacitance sensor may contain two sets of electrodes, 3 sets of electrodes, or more.

In this example, the first set 501 of electrodes has ten electrodes and the second set 502 has six electrodes, therefore, the mutual capacitance sensor formed by the overlapping sets may be classified as a ten by six sensor. While this example depicts a ten by six sensor, a sensor may incorporate more or less electrodes. The size of a capacitance module may be based at least in part by the number of electrodes in the sensor of the module. A capacitance module incorporated into a device such as a laptop may feature a 24 by 16 sensor, whereas a capacitance module incorporated into a device such as a handheld computer may feature an eight-by-eight sensor. Further, capacitance modules for gaming input devices, display screens, or other types of devices may have different sizes based at least in part on the dimension of the device. While this description has identified specific sizes, and electrode counts, any appropriate size or electrode count may be used in accordance with the principles described in this present disclosure.

The processor 505 may be used to operate the mutual capacitance sensor. The electrodes of the first set 501 and the electrodes of the second set 502 are connected to the processor 505 by individual traces. The processor 505 may be programmed to operate the electrodes of the first set 501 or second set 502 of electrodes as transmit electrodes, sense electrodes, as both, or another type of electrodes.

The processor 505 may operate the first set 501 of electrodes as transmit electrodes at one time, and as sense electrodes at another time. Likewise, the processor 505 may operate the second set 502 of electrodes as transmit electrodes at one time, and sense electrodes at another time. The first set 501 and second set 502 of electrodes may have a reciprocal relationship. When the electrodes of the first set 501 are operated as transmit electrodes, the electrodes of the second set 502 are operated as sense electrodes, and vice versa. By toggling sensing operations between the first set 501 and second set 502, the capacitance measurements may include less noise, which may improve the measurement accuracy of the capacitance module 500.

The processor of a mutual capacitance sensor may detect user input by activating at least one transmit electrode and then determining the strength of the electric field between the transmit electrode(s) and at least one sense electrode by detecting the capacitance of the sense electrode(s). When an object approaches a mutual capacitance sensor, the electric field may change, changing the capacitance as measured with the sense electrode(s). The processor may detect the change of capacitance and determine the location of the user input based on the change. The processor may then activate another transmit electrode and repeat the process, continually transmitting and scanning. One cycle of this process may take as little as a two to three microseconds.

When executing a transmit operation, the processor may activate a portion of electrodes from the selected set simultaneously, together, during a common period, or combinations thereof. In some cases, the electrodes in a portion may be activated at slightly different times, but still activated during a common period of time. For example, in some cases where the electrodes in the portion received transmit signals with different phases, one of the electrodes may start at a different time or end at a different time than the other signal. However, even in examples where each of the electrodes in the same portion receive the same signal phase, the signals may start and or stop at different times.

A portion of electrodes may be two adjacent electrodes in a set, three adjacent electrodes in a set, two electrodes that are separated by at least one intervening electrode in a set (where the intervening electrode is not included in the portion), multiple electrodes with at least one non-activated electrode between multiple activated electrodes, other arrangements, or combinations thereof.

Activating a portion of electrodes in a set instead of activating electrodes one at a time may provide some advantages. For example, in cases where a processor activates portions with two electrodes, the capacitance module may cycle through a set of electrodes twice as quickly. In cases where a processor activates portions with three electrodes, the capacitance module may cycle through a set three times as quickly, and so on. Cycling through a set of electrodes more quickly may result in a higher frame rate for a capacitance module, increasing responsiveness.

In some examples, activating portions of electrodes at the same time may include a tradeoff of lowering the capacitance module's precision in identifying a location of a user input. In some cases, only a single input may be detected by an activated region. In such examples, if a user input is detected within a small, activated region, then the capacitance module can determine that the user input happened within the area of the small, activated region. In such examples, when a larger electric field generated (which is what happens when multiple electrodes are activated at the same time), the capacitance module may determine that user input occurred within this larger area. Thus, the larger activation areas may pinpoint the location within a larger region, while smaller activation areas may determine that the user input is confined to a smaller area. Thus, in some examples, when frame rate and responsiveness of the capacitance module are increased, the input accuracy of the capacitance module may be reduced.

In the illustrated example of FIG. 5, the first set of electrodes are grouped into five portions for simultaneous activation: a first portion of electrodes 506a, a second portion of electrodes 506b, a third portion of electrodes 506c, a fourth portion of electrodes 506d, and a fifth portion of electrodes 506e. The second set of electrodes are also grouped into three portions for simultaneous activation, which will be referred to as a sixth portion of electrodes 507a, a seventh portion of electrodes 507b, and an eighth portion of electrodes 508c for the purposes of describing the illustrated example.

The processor 505 may activate the first portion 506a of electrodes by applying an electrical signal to each electrode in the first portion. After the processor 505 activates the first portion 506a, the processor 505 may measure the capacitance of each electrode in the second set 502. In some examples, taking a capacitance measurement from each electrode in the second set 502 may include the processor 505 forming an aggregate capacitance measurement by averaging the measurements from each electrode and subtracting the average measurement from the strongest capacitance measurement. In examples that include averaging the capacitance measurements and subtracting the average from the strongest capacitance measurement, noise may be excluded from the aggregate measurement, which may result in a clearer signal and improved input accuracy. The signal may be used by the processor 505 to determine the location of user input. While this example has been described with reference to averaging measurements and subtracting average measurement, other appropriate procedures may be implemented to process the results of the measurements.

After activating the first portion 506a of electrodes on the first layer 503 and sensing the capacitance change of the electrodes in the second set 502, the processor 505 may repeat this process by activating a second portion 506b of electrodes on the first layer 503 and sensing the capacitance change using the electrodes in the second set. The processor may then repeat this process in sequence, activating a third portion 506c, fourth portion 506d, and fifth portion 506e, until each portion of electrodes in the first set 501 has been activated.

After each portion 506a-506e of electrodes in the first set 501 has been activated, the processor 505 may then operate the electrodes of the first set as sense electrodes, and the electrodes of the second set 502 as transmit electrodes. The processor 505 may activate a sixth portion 507a of electrodes on the second layer 504 by applying an electrical signal to each electrode in the sixth portion. Once the sixth portion 507a has been activated, the processor 505 may measure the capacitance of each electrode in the first set 502. The processor 505 may calculate an aggregate capacitance measurement by averaging the measurements from each electrode and subtracting the average measurement from the strongest capacitance measurement or by some other process. In some examples, by averaging the capacitance measurements and subtracting the average from the strongest capacitance measurement, noise may be excluded from the aggregate measurement, which may result in a clearer signal and improved input accuracy. The signal may be used by the processor 505 to determine the location of user input.

After activating the sixth portion 507a of electrodes and sensing the capacitance change of the electrodes in the first set 501, the processor 505 may repeat this process with the seventh portion 507b and eighth portion 507c, once again sensing capacitance changes using the electrodes in the first set.

In some cases, the improved input accuracy achieved by calculating an aggregate measurement of the sense measurements may offset the decrease in input accuracy caused by activating transmit electrodes in portions instead of activating them individually. By combining the two processes, a capacitance module may have both improved responsiveness and accuracy.

While the processor 505 may activate the portions of electrodes in a linear sequence (i.e., the first portion 506a is activated first, then the second portion 506b, and so on until the eighth portion 507c), an activation sequence need not be linear. For instance, the processor 505 may activate the first portion 506a of electrodes and then activate the third portion 506c, followed by the fifth portion 506e, the second portion 506b, and the fourth portion 506d respectively.

The processor 505 may activate a portion of electrodes in the first set of electrodes 501, then a portion of electrodes in the second set of electrodes 502. For example, the processor 505 may activate the first portion 506a and then activate the sixth portion 507a, followed by the second portion 506b, seventh portion 507b, and third portion 506c respectively.

The processor 505 may activate the portions of electrodes in a random sequence. The processor 505 may be programmed to randomly activate a portion of electrodes. In some cases where the processor is operating the capacitance module in a random sequence, the processor may ensure that each portion of electrodes is activated at least once before activating another portion of electrodes a second time.

Activating the portions of electrodes in a non-linear sequence may present a few advantages. The responsiveness of a capacitance module may be improved, along with input-consistency.

Figure 5A:
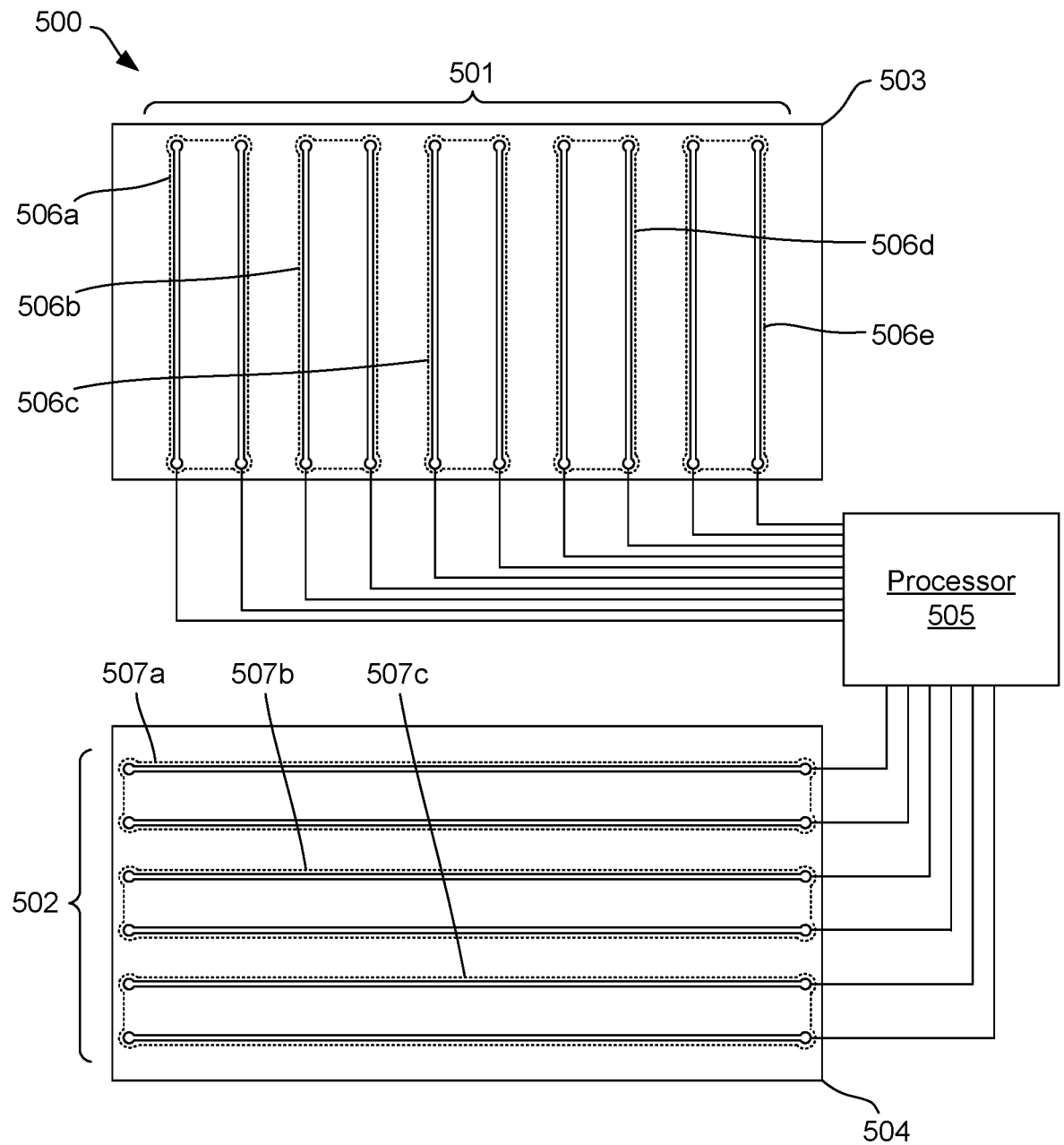
FIG. 5a depicts an example of a capacitance module in accordance with the present disclosure.
Figure 5B:
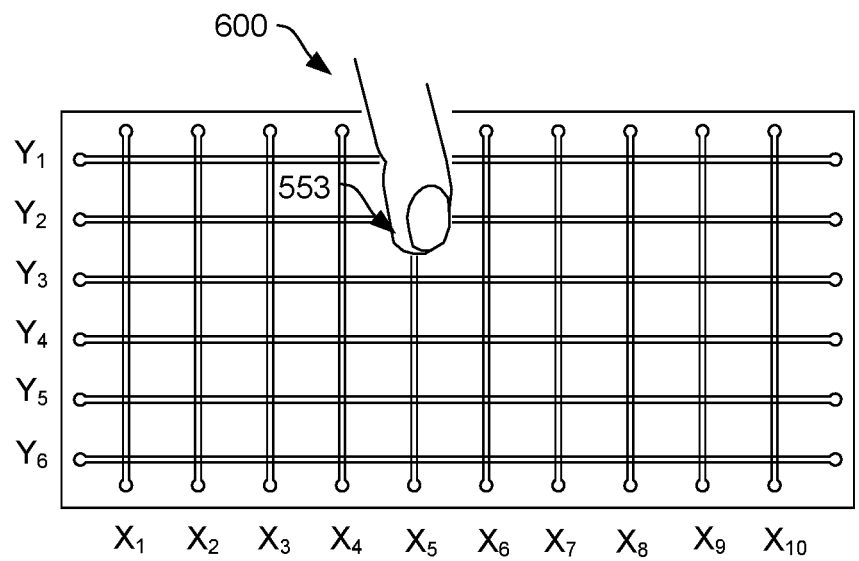
FIG. 5b depicts an example of a capacitance module in accordance with the present disclosure.
Figure 5C:
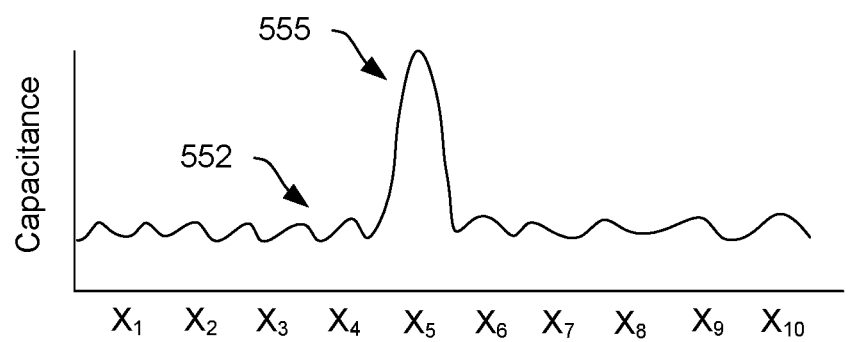
FIG. 5c depicts an example of a capacitance measurement in accordance with the present disclosure.

In the example depicted in FIG. 5b, a finger 551 is making a user input at the intersection 553 of electrode $X_5$ and $Y_2$. In some cases of operating the capacitance module, each of the Y electrodes may be energized at the same time as each other with a transmit signal, and each of the X electrodes may measure the resulting change in capacitance at the same time as each other. In this example, each of the X electrodes may report separate measurements, which can be analyzed to determine which X electrode corresponds to the location of the user input as depicted in FIG. 5c. As can be seen in the example depicted in FIG. 5c, the electrode with characteristically higher change in capacitance may be classified as the electrode corresponding to the location of the user input. In this example, the X electrode with the characteristic capacitance measurement 550 is electrode $X_5$.

Also depicted in FIG. 5c is a baseline level 552 of electrical interference considered to be a base level of capacitance based on noise at the time that the electrodes in FIG. 5b are energized. In this application, the higher capacitance measurement 550 on electrode $X_5$ has characteristics that are distinguishable from the baseline level 552 and can be correlated as the electrode corresponding with the user input's location.

Figure 5D:
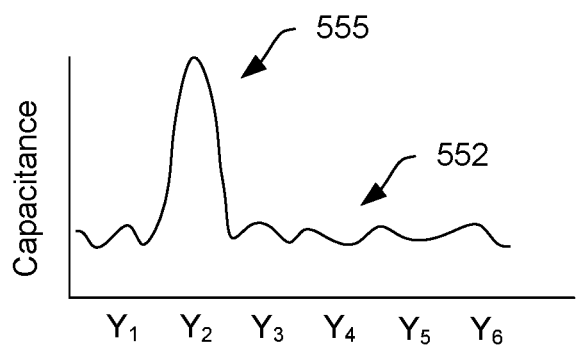
FIG. 5d depicts an example of a capacitance measurement in accordance with the present disclosure.

FIG. 5d represents measurements taken when each of the X electrodes are used as the transmit electrodes and are activated at the same time. The measurements include another baseline level 554 of capacitance based on noise that may be similar or different than the baseline level 552 of capacitance from the Y transmit electrodes. In this case, each of the Y electrodes measure the resulting capacitance at the same time and report separate measurements per Y electrode. The sense electrode corresponding with the location of the user input may be distinguishable from the other electrodes due to the characteristically higher measurement 555 above the baseline level 552.

In the examples of FIGS. 5b-5d, when the Y electrodes activated with the transmit signal, the X electrode corresponding to the user input location is identified. Also, in the examples of FIGS. 5b-5d, when the X electrodes are activated with the transmit signal at the same time, the Y electrode corresponding to the user input location is identified. Thus, by activating all the electrodes in one set at the same time, and then switching to activate all the electrodes in the other set at the same time, the location of the user input location along among the Y electrodes and the X electrodes may be found with a high resolution and confidence.

While the example of FIGS. 5b-5d has been described with all the electrodes in a first axis being activated at the same time with a transmit signal, in other examples, multiple groups of the electrodes in the same axis may be activated separately with the transmit signal. For example, half of the transmit electrodes in the first axis may be activated with all the electrodes in the second, orthogonal axis measuring the capacitance at the same time as each other. Then the remaining half of the electrodes in the first axis may be activated with the transmit signal at the same time, and all the electrodes in the second axis may measure the capacitance for this second group of transmit signals at the same time as each other. In this example, the second axis electrode corresponding to user input's location may be located in one of the two transmit cycles, while the other transmit cycle may not identify the second axis electrode correspond to the user input location. In this example, the second axis electrode corresponding to the user input location may be identified in just two transmit cycles. Then, in examples where the second axis electrodes switch to drive the transmit signal, the first axis electrode corresponding to the user input may be found. In those cases where all the second axis electrodes carry the transmit signal at the same time, the first axis electrode corresponding to the user input location may be found in a single cycle. In those examples where the second axis electrodes are activated in two separate groups, the first axis electrode corresponding to the user input location may be found in two cycles. Thus, in an example, such as the example just described, the user input may be determined with a high confidence in just three or four transmit cycles.

As described above in relation to FIGS. 5b-5d, the user input location may be found in just two to four cycles. In contrast, some transmit protocols may involve imposing a transmit signal on each electrode of one axis each individually. In the case of the depicted Y axis, six transmit cycles would be involve under this protocol to find the user input location. In the case of the depicted X axis, ten transmit cycles would be involved under this protocol to find the user input location. Thus, by grouping the electrodes per axis into one or more groups, the frame rate for determining user input location may be sped up.

Figure 5E:
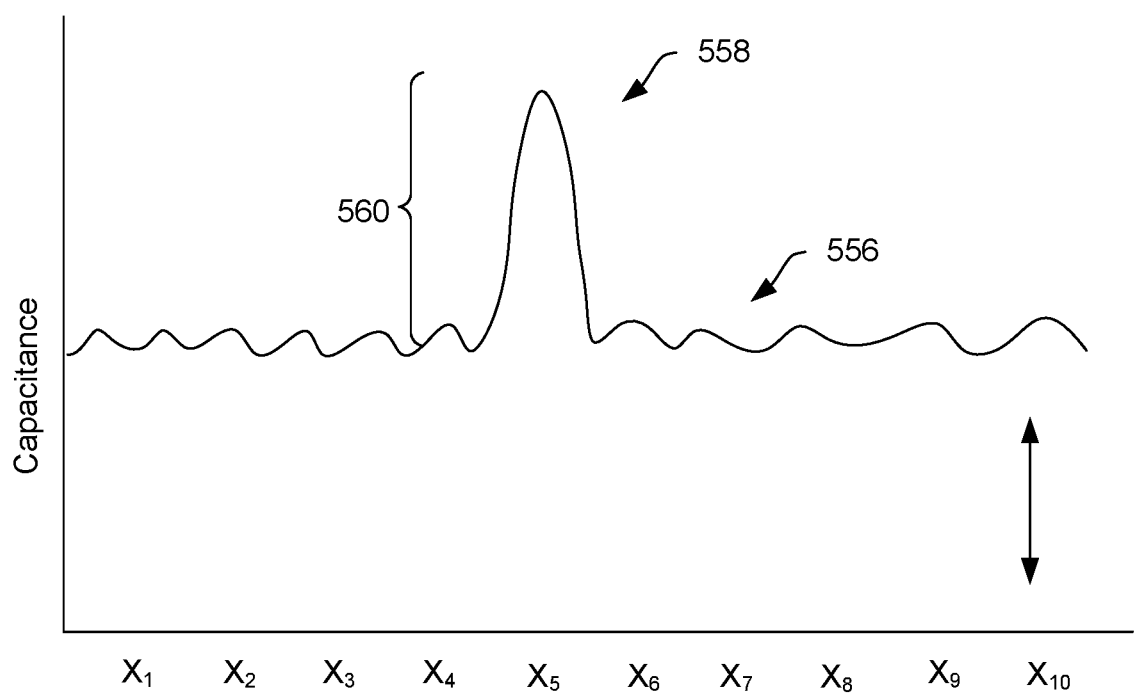
FIG. 5e depicts an example of a capacitance measurement in accordance with the present disclosure.

FIG. 5e depicts an example of a capacitance measurement. In this example, the base level 556 of noise is greater than the base level 552 of noise depicted in FIG. 5c. However, the difference between the peak 558 of the higher capacitance measurement and the base level 556 is similar to that depicted in FIG. 5c. One of the advantages of a capacitance measuring protocol where the axes are toggled between transmitting and measuring and grouping the transmit electrodes is that the variance 560 between the peak of the capacitance single corresponding to the user location and the base level of noise are distinguishable. Thus, even in applications where the capacitance measuring environment is very noisy, the shape of the measurement corresponding to the user input location may be distinguishable from the noise base level with a high level of confidence. Some noisy environments that may be well suited for the principles described herein include capacitance modules with a near field antenna, capacitance modules with a Wi-Fi antenna, capacitance modules with a noise producing device nearby, capacitance modules without a shield layer, other applications, or combinations thereof.

Figure 6:
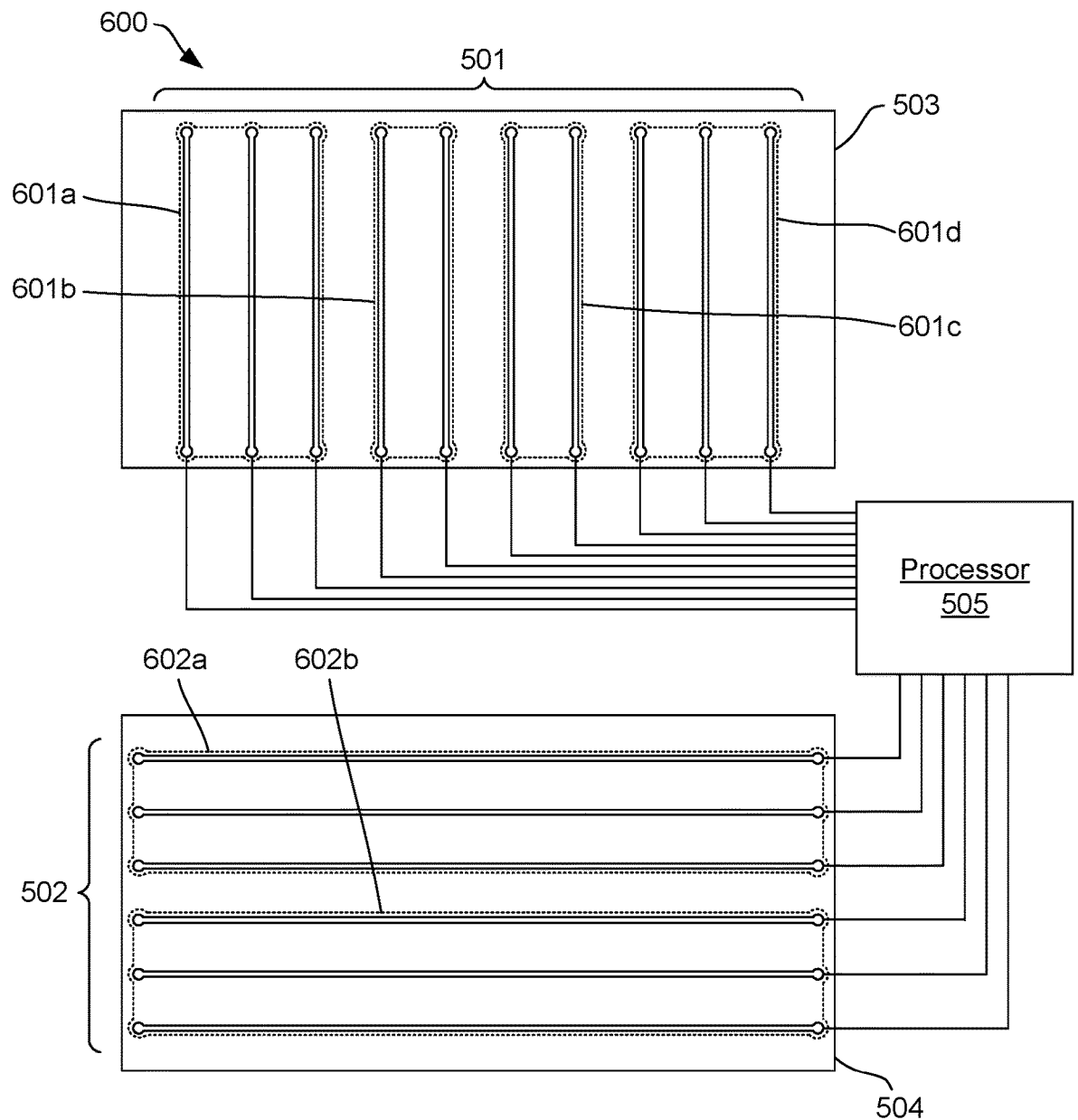
FIG. 6 depicts an example of a capacitance module in accordance with the present disclosure.

FIG. 6 depicts an example of a capacitance module 600 in accordance with the disclosure. In this example, a first portion 601a and fourth portion 601d of electrodes in the first set 501 and a fifth portion 602a and sixth portion 602b of electrodes in the second set 502 contain three electrodes each. A second portion 601b and third portion 601c of electrodes in the first set 501 of electrodes contain two electrodes each.

Because some portions of electrodes contain three electrodes instead of two electrodes in this example, the frame rate of the capacitance module 600 may be faster than a capacitance module with portions of only two electrodes. A faster frame rate may improve responsiveness of the capacitance module 600.

The second portion 601b and third portion 601c of electrodes are adjacent to each other and located between the first portion 601a and fourth portion 601d of electrodes. Because portions of electrodes that include fewer electrodes may be more accurate to input than portions that include a greater number of electrodes, portions with fewer electrodes may be positioned within locations of a capacitance module where a user is more likely to interact with the module. For example, in cases where a capacitance module is integrated into a laptop as a trackpad, a user may be more likely to interact with the trackpad within a central area of the trackpad. In such an example, the electrodes may be grouped for higher precision in the central area of the trackpad.

While the example of FIG. 6 depicts a specific non-uniform portioning of electrodes, any appropriate portioning of electrodes, where the portions have a different number of electrodes may be used in accordance with the principles of the present disclosure.

Figure 7:
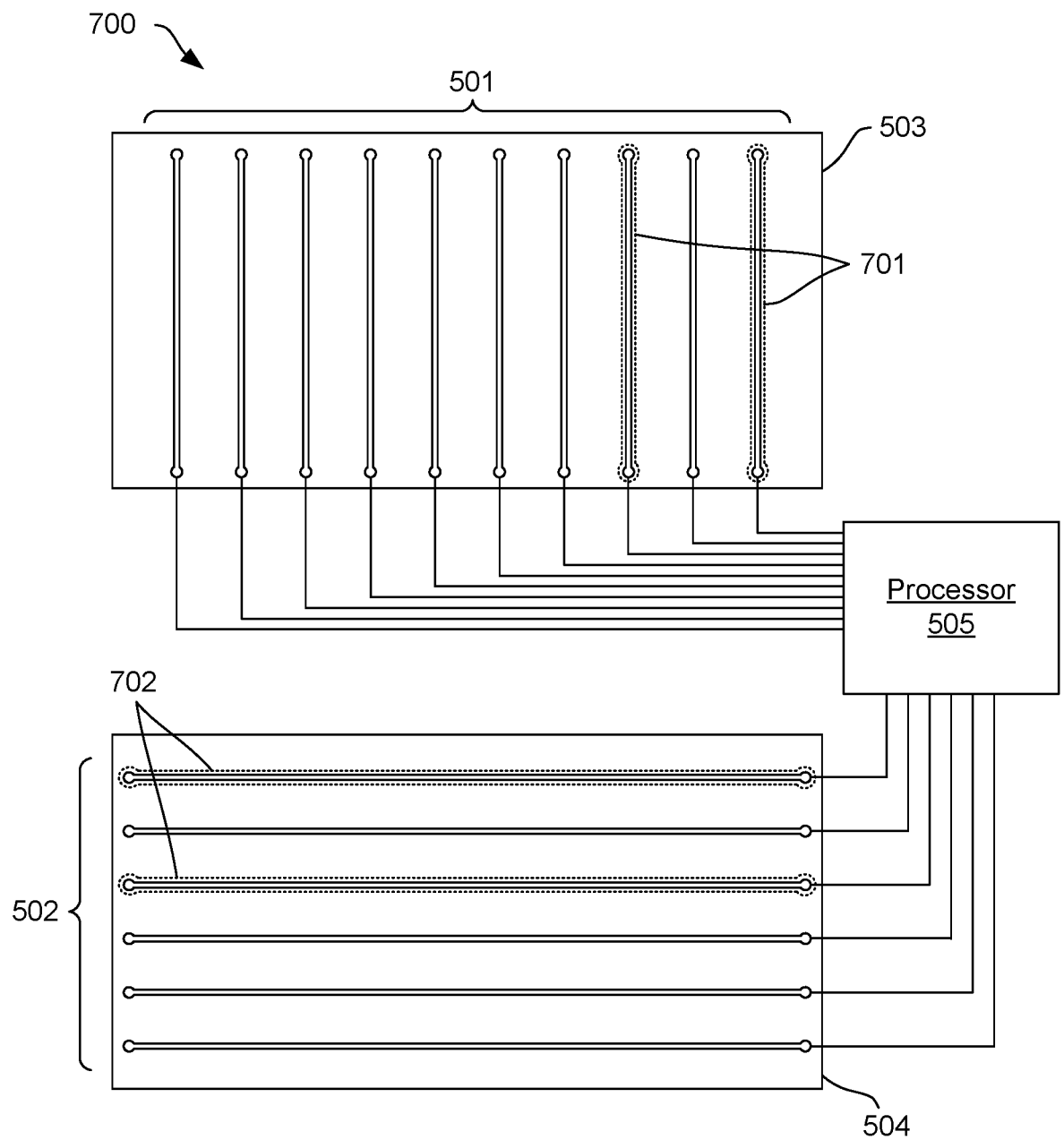
FIG. 7 depicts an example of a capacitance module in accordance with the present disclosure.

FIG. 7 depicts an example of a capacitance module 700 in accordance with the disclosure. In this example, a first portion 701 of electrodes in the first set 501 and a second portion 702 of electrodes in the second set 502 include two electrodes that are separated by a third electrode which is not included in the portion. By activating portions of electrodes where the electrodes are separated from each other by at least one electrode, the input-sensitive region created by a portion of electrodes may be spread out, increasing sensitivity.

Figure 8:
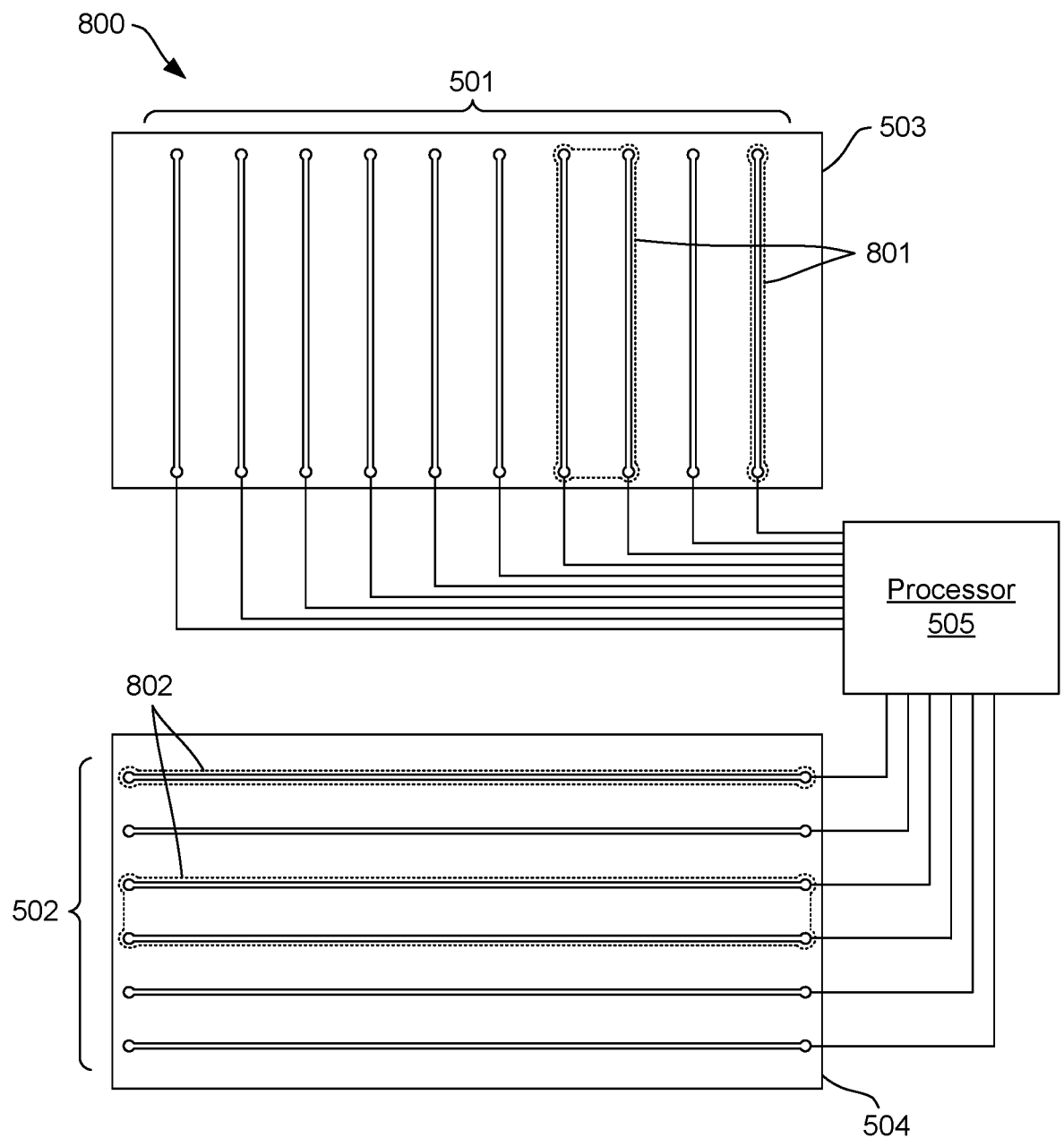
FIG. 8 depicts an example of a capacitance module in accordance with the present disclosure.

FIG. 8 depicts an example of a capacitance module 800 in accordance with the disclosure. In this example, a first portion 801 of electrodes in the first set 501 and a second portion of electrodes 802 in the second set 502 include two adjacent electrodes and a third electrode which is separated from the adjacent electrodes by another electrode which is not included in the portion.

Figure 9:
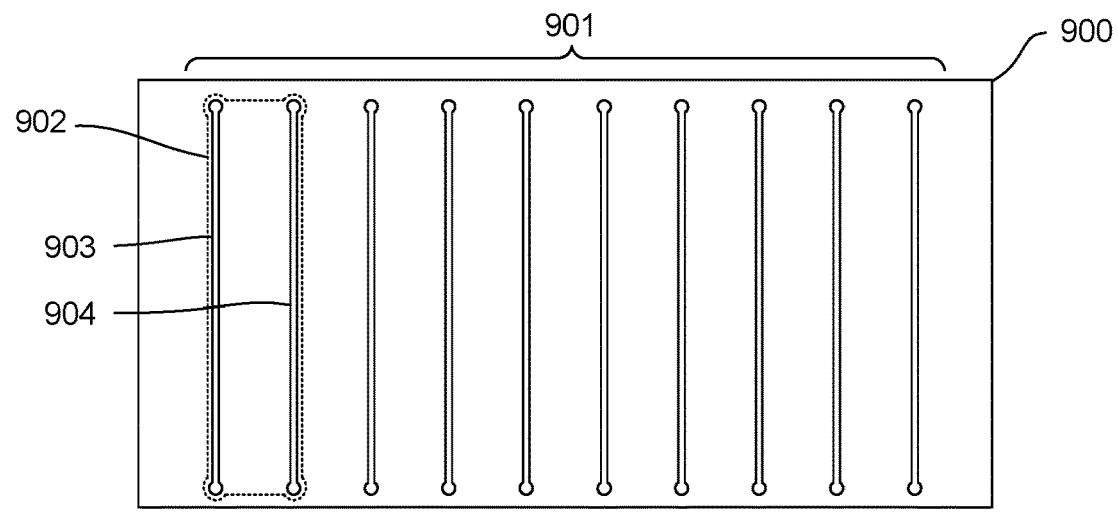
FIG. 9 depicts an example of a layer of a capacitance module and signal graphs in accordance with the present disclosure.
Figure 9:
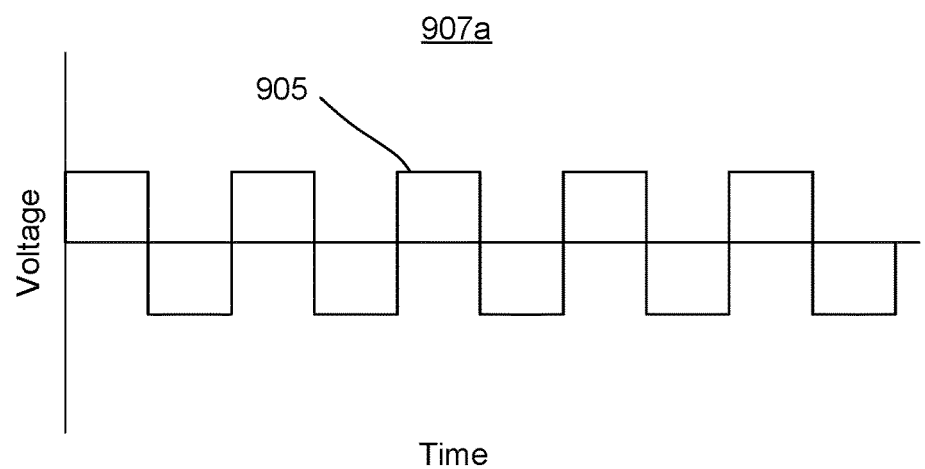
Figure 9:
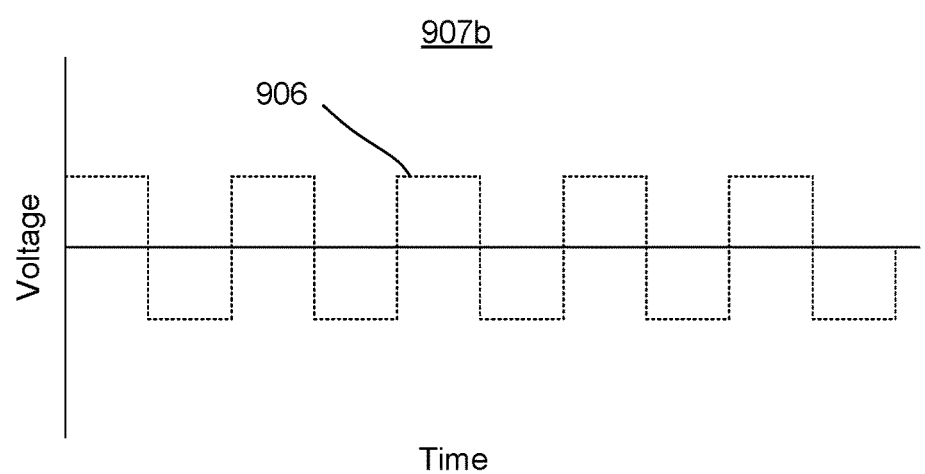

FIG. 9 depicts an example of a layer of a capacitance module and signal graphs in accordance with the present disclosure. In this example, the layer 900 contains a set 901 of electrodes. A portion 902 of electrodes in the set 901 includes a first electrode 903 and second electrode 904.

When an electrical signal is applied to a portion of electrodes, the electrical signals applied to each electrode within the portion have the same characteristic or different characteristics. For example, electrical signals applied to different electrodes within a portion may have different frequencies, phases, amplitudes, and/or combinations thereof. In this illustrated example, the electrical signals applied to the first electrode 903 and second electrode 904 have the same characteristics. The electrical signals have the same frequency, phase, and amplitude.

For illustrative purposes, a first signal graph 907*a* and a second signal graph 907*b* chart voltage versus time. The electrical signal applied to the first electrode 903 is represented by a first waveform 905 charted on the first signal graph 907*a*, and the electrical signal applied to the second electrode 904 is represented by a second waveform 906 charted on the second signal graph 907*b*. The second waveform 906 is depicted with a dashed line for clarity.

The first waveform 905 and the second waveform 906 have the same amplitude and frequency. The first waveform 905 and the second waveform 906 are also in phase with each other. By applying electrical signals of the same phase to electrodes within a portion, constructive interference may occur between the waveforms. The larger electrode field created by activating a portion of electrodes may be caused, in part, because of constructive interference between the signals applied to electrodes in the portion.

Figure 10:
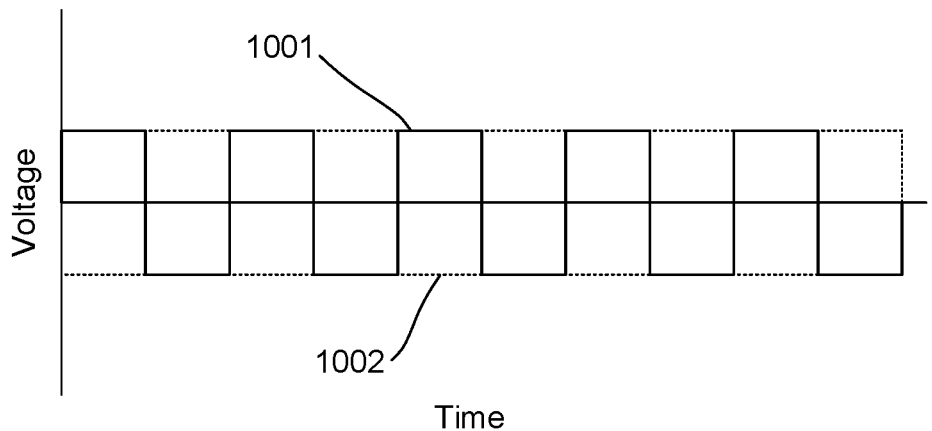
FIG. 10 depicts an example of a signal graph in accordance with the present disclosure.

FIG. 10 depicts an example of a signal graph in accordance with the present disclosure. In this example, a first waveform 1001 represents an electrical signal applied to an electrode in a portion of electrodes. A second waveform 1002 represents an electrical signal applied to another electrode in the same portion.

In this example, the first waveform 1001 and second waveform 1002 have the same frequency and amplitude, but the second waveform is 180 degrees out phase with the first waveform. In this example, the first waveform and the second waveform 1002 have opposite phases. In some cases, applying electrical signals of opposite phases to electrodes within a portion, the electrical signals may experience destructive interference or phase cancellation. Phase cancellation may cause the generated electric field to be smaller when the electrodes are activated together.

In instances where electrical signals are out of phase at an angle of less than or greater than 180 degrees, certain parts of the waveforms may constructively interfere, and other parts may destructively interfere. The constructive and destructive interference may be tuned to achieve specially localized electrical fields.

In some examples, the first and second waveforms 1001, 1002 may be in phase with each other. In other examples, the first and second waveforms 1001, 1002 may be out of phase with each other. Out of phase examples may include orthogonal phases, 180 degrees out of phase, or another appropriate degree out of phase.

Figure 11:
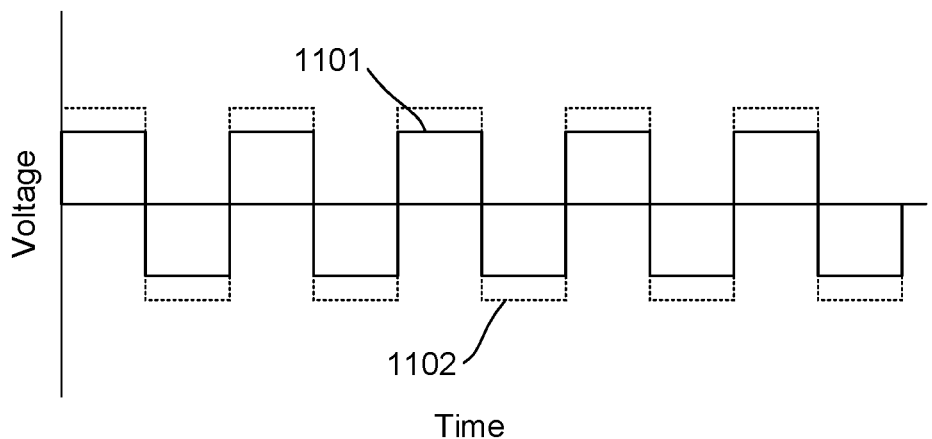
FIG. 11 depicts an example of a signal graph in accordance with the present disclosure.

FIG. 11 depicts an example of a signal graph in accordance with the present disclosure. In this example, a first waveform 1101 represents an electrical signal applied to an electrode in a portion of electrodes. A second waveform 1102 represents an electrical signal applied to another electrode in the same portion.

While the first waveform 1101 and second waveform 1102 have the same frequency and phase, the amplitude of the first waveform is less than the amplitude of the second waveform. When the amplitude of one electrical signal applied to an electrode is greater than the amplitude of an electrical signal applied to another electrode, the electrode whose signal has the greater frequency may be more sensitive to input.

Figure 12:
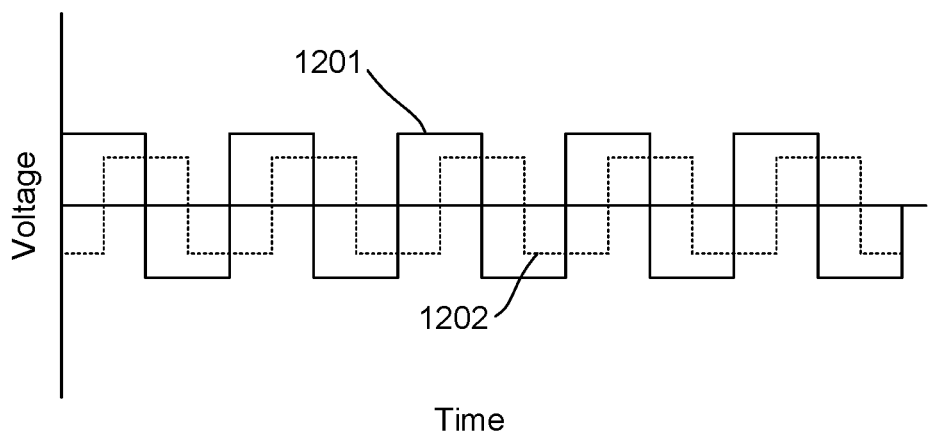
FIG. 12 depicts an example of a signal graph in accordance with the present disclosure.

FIG. 12 depicts an example of a signal graph in accordance with the present disclosure. In this example, a first waveform 1201 represents an electrical signal applied to an electrode in a portion of electrodes and a second waveform 1202 represents an electrical signal applied to another electrode in the same portion. The first waveform 1201 and second waveform have the same frequency, but different amplitudes and phases. The first waveform 1201 has a greater amplitude than the second waveform 1202, and the two are out phase with each other by about 90 degrees.

Figure 13:
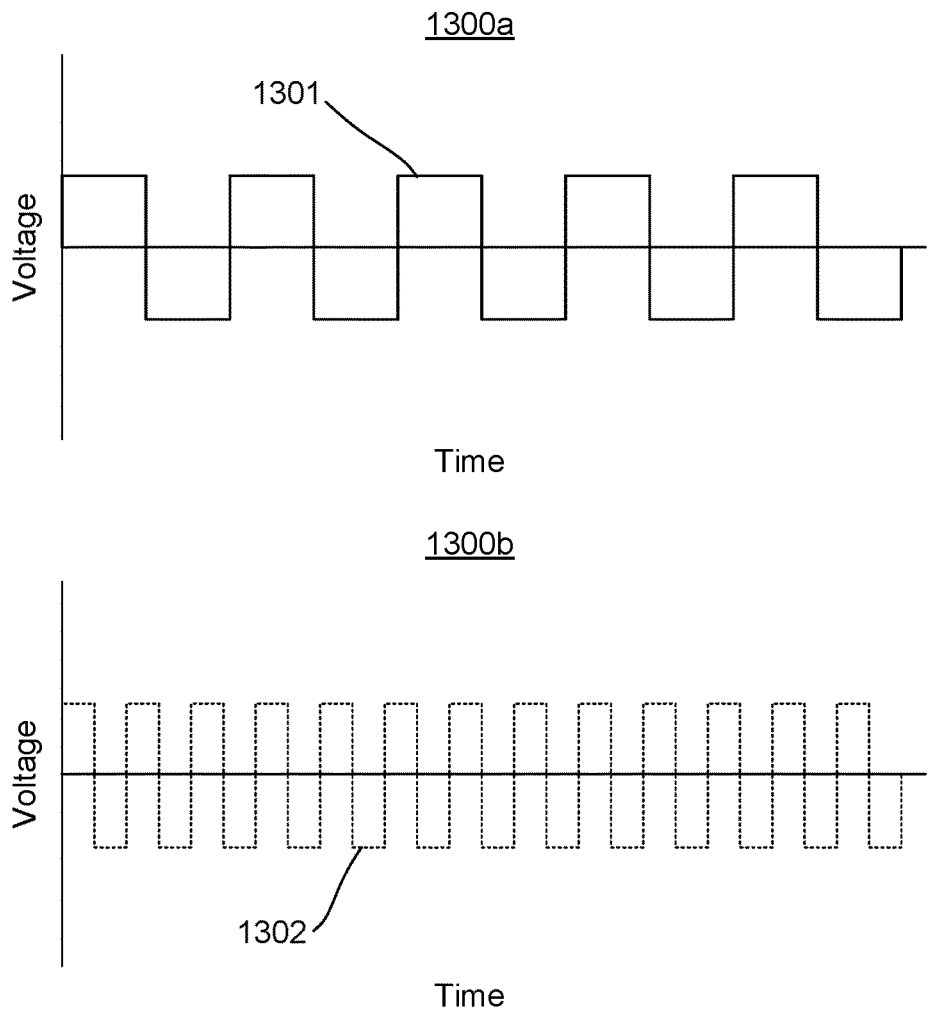
FIG. 13 depicts an example of signal graphs in accordance with the present disclosure.

FIG. 13 depicts an example of signal graphs in accordance with the present disclosure. In this example, a first signal graph 1300*a* depicts a first waveform 1301. The first waveform 1301 represents an electrical signal applied to an electrode in a portion of electrodes. A second signal graph 1300*b* depicts a second waveform 1302. The second waveform 1302 represents an electrical signal applied to an electrode in a portion of electrodes. The first waveform 1301 and second waveform 1302 are shown on separate graphs for clarity.

The first waveform 1301 and the second waveform 1302 have the same amplitude and phase, but different frequencies. In this example, the frequency of the second waveform 1302 may be twice the frequency of the first waveform 1301. Applying electrical signals of different frequencies to electrodes in a portion may vary the modulation of the electrical field generated by the portion, which may be tuned to increase responsiveness and/or accuracy.

Figure 14:
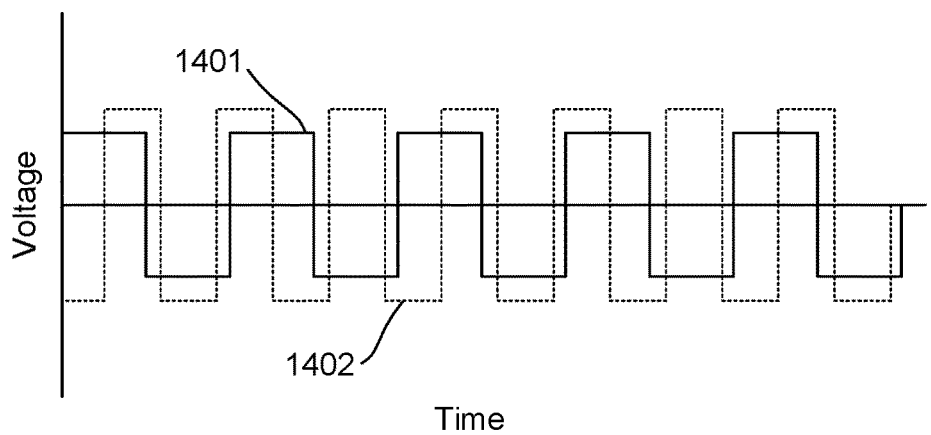
FIG. 14 depicts an example of a signal graph in accordance with the present disclosure.

FIG. 14 depicts an example of a signal graph in accordance with the disclosure. In this example, a first waveform 1401 represents an electrical signal applied to an electrode in a portion and a second waveform 1402 represents an electrical signal applied to another electrode in the same portion. The first waveform 1401 and second waveform 1402 may have different amplitudes, phases, and frequencies.

Figure 15:
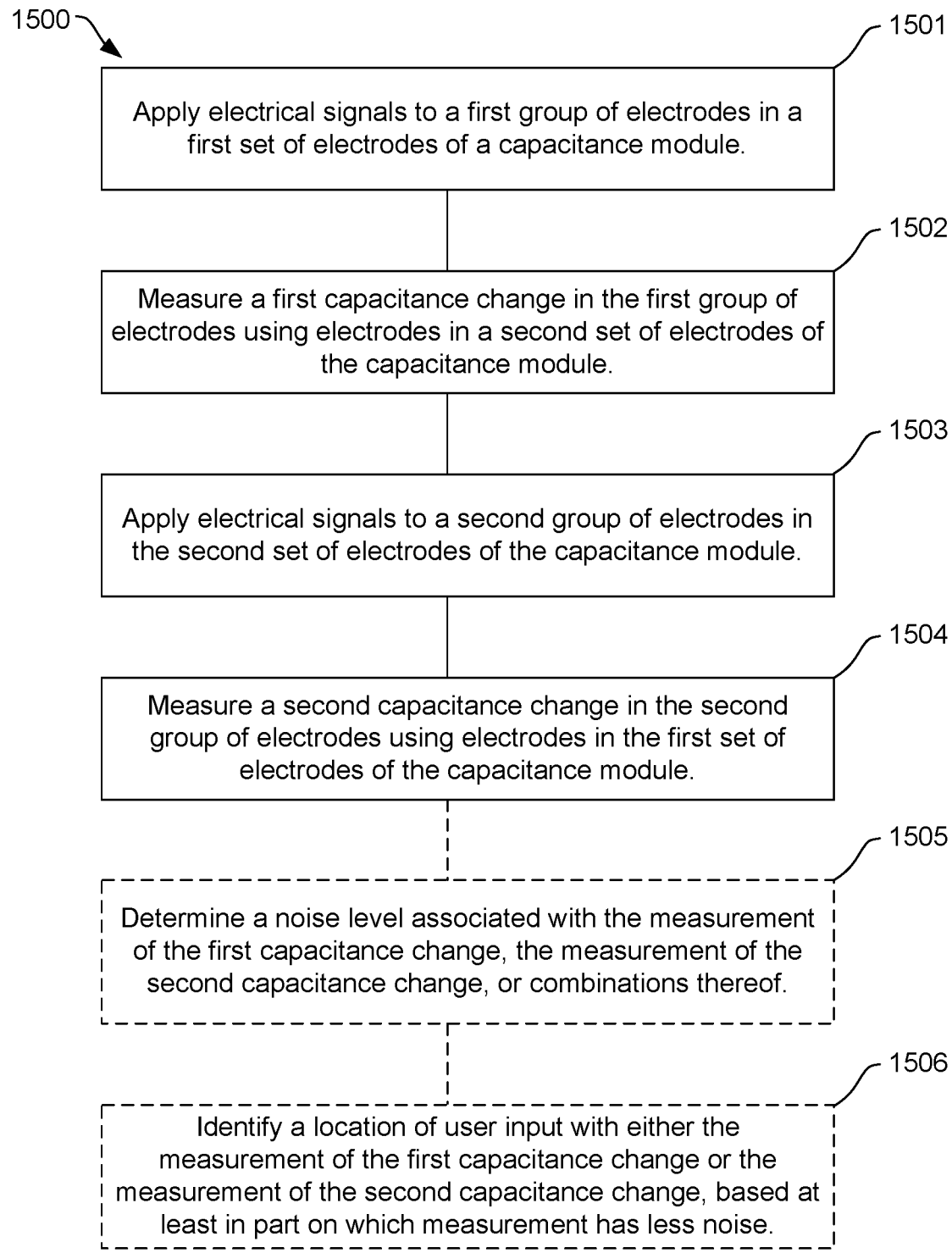
FIG. 15 depicts an example of a method for operating a capacitance module in accordance with the present disclosure.

FIG. 15 depicts an example of a method for operating a capacitance module in accordance with the present disclosure. This method 1500 may be performed based on the description of the devices, modules, and principles described in relation to FIGS. 1-14. In this example, the method 1500 includes applying 1501 electrical signals to a first group of electrodes in a first set of electrodes of a capacitance module; measuring 1502 a first capacitance change in the first group of electrodes using electrodes in a second set of electrodes of the capacitance module; applying 1503 electrical signals to a second group of electrodes in the second set of electrodes of the capacitance module; and measuring 1504 a second capacitance change in the second group of electrodes using electrodes in the first set of electrodes of the capacitance module.

The method 1500 may optionally include determining 1505 a noise level associated with the measurement of the first capacitance change, the measurement of the second capacitance change, or combinations thereof. Further, the method 1500 may optionally include identifying 1506 a location of user input with either the measurement of the first capacitance change or the measurement of the second capacitance change, based at least in part on which measurement has less noise.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module, comprising:
   a first set of electrodes;
   a second set of electrodes transversely oriented from the first set of electrodes;
   a processor and memory;
   the memory having programmed instructions to cause the processor, when executed, to:
   activate all electrodes in the first set;
   measure a first resulting capacitance from activating all the electrodes of the first set with all the electrodes of the second set;
   activate all electrodes in the second set;
   measure a second resulting capacitance from activating all the electrodes of the second set with all electrodes of the first set;
   forming an aggregate capacitance measurement by averaging the measurements from each electrode and subtracting the average measurement from the strongest capacitance measurement; and
   identify a user location relying on just the first resulting capacitance and the second resulting capacitance.

2. The module of claim 1, wherein electrical signals applied to the electrodes in the first set and the electrodes in the second set are in phase with each other.

3. The module of claim 1, wherein electrical signals applied to the electrodes in the first set and the electrodes in the second set are out of phase with each other.

4. The module of claim 3, wherein the electrical signals are out of phase with each other.

5. The module of claim 3, wherein transmitting the signals out of phase has the characteristic of changing the electric field created by the electrodes.

6. The module of claim 1, wherein electrical signals applied to the electrodes in the first set and the electrodes in the second set have the same signal strength.

7. The module of claim 1, wherein the electrical signals applied to the electrodes in the first set and the electrodes in the second set have different signal strengths.

8. The module of claim 1, wherein electrical signals applied to the electrodes in the first set and the electrodes in the second set have the same frequencies.

9. The module of claim 1, wherein electrical signals applied to the electrodes in the first set and the electrodes in the second set have different frequencies.

10. The module of claim 1, wherein the memory includes programmed instructions to cause the processor, when executed, to determine a noise level associated with the measurement of the first capacitance change, the measurement of the second capacitance change, or combinations thereof.

11. The module of claim 10, wherein the memory includes programmed instructions to cause the processor, when executed, to identify a location of user input with either the measurement of the first capacitance change or the measurement of the second capacitance change, based at least in part on which measurement has less noise.

* * * * *